United States Patent
Bähren et al.

(10) Patent No.: US 9,319,239 B2
(45) Date of Patent: Apr. 19, 2016

(54) DATA NETWORK WITH A TIME SYNCHRONIZATION SYSTEM

(75) Inventors: Frank Bähren, Pforzheim (DE); Harald Schöpp, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 880 days.

(21) Appl. No.: 12/244,744

(22) Filed: Oct. 2, 2008

(65) Prior Publication Data
US 2009/0100189 A1  Apr. 16, 2009

(30) Foreign Application Priority Data
Oct. 4, 2007 (EP) .................... 07019478

(51) Int. Cl.
| | |
|---|---|
| G06F 15/16 | (2006.01) |
| H04L 12/42 | (2006.01) |
| H04L 12/423 | (2006.01) |
| H04L 12/437 | (2006.01) |
| H04L 12/433 | (2006.01) |

(52) U.S. Cl.
CPC ............ *H04L 12/422* (2013.01); *H04L 12/423* (2013.01); *H04L 12/437* (2013.01); *H04L 12/433* (2013.01)

(58) Field of Classification Search
CPC ... H04L 12/422; H04L 12/437; H04L 12/423; H04L 12/433
USPC ......................................... 709/231
See application file for complete search history.

(56) References Cited

U.S. PATENT DOCUMENTS

| | | | | |
|---|---|---|---|---|
| 4,759,015 A | * | 7/1988 | Takai ................. | H04L 12/433 370/216 |
| 4,779,087 A | * | 10/1988 | Fukuda et al. .............. | 370/223 |
| 4,894,846 A | * | 1/1990 | Fine .............................. | 375/356 |
| 5,274,637 A | * | 12/1993 | Sakamura .......... | H04L 12/433 370/455 |
| 5,331,636 A | * | 7/1994 | Yang ................. | H04L 12/4637 370/403 |
| 5,377,190 A | * | 12/1994 | Yang ................. | H04L 12/4637 370/456 |
| 5,390,188 A | * | 2/1995 | Dawson ............. | H04L 43/0847 714/706 |
| 5,481,538 A | * | 1/1996 | Yang ................. | H04L 12/4637 370/456 |
| 5,508,998 A | * | 4/1996 | Sha .................... | H04L 12/437 370/222 |

(Continued)

FOREIGN PATENT DOCUMENTS

| | | |
|---|---|---|
| EP | 1 503 543 A1 | 2/2005 |
| JP | 07230414 * | 8/1995 |

OTHER PUBLICATIONS

Savage et al.; TCP Congestion Control with a Misbehaving Receiver; Feb. 1, 2001; Dept. of CS and Engineering; U of Washington, Seattle; 8 Pages.*

(Continued)

*Primary Examiner* — Krista Zele
*Assistant Examiner* — Anthony Fabbri
(74) *Attorney, Agent, or Firm* — Alleman Hall McCoy Russell & Tuttle LLP (57) ABSTRACT

A system matches frame counter values between a timing master and one or more slave devices in a synchronous network. To detect synchronization losses, a timing master counts transmitted frames of a continuous data stream. When a synchronization loss occurs, the timing master transmits a message to the slave devices that includes a synchronization frame counter value. The message synchronizes the frame counter value of the timing master to the frame counter value of the slave devices.

20 Claims, 6 Drawing Sheets

(56) References Cited

U.S. PATENT DOCUMENTS

| | | | | |
|---|---|---|---|---|
| 5,657,315 | A * | 8/1997 | Waclawsky | H04J 3/0626 252/516 |
| 5,794,018 | A * | 8/1998 | Vrvilo et al. | 713/400 |
| 5,848,028 | A * | 12/1998 | Burklin | 368/46 |
| 5,925,107 | A * | 7/1999 | Bartfai et al. | 709/248 |
| 5,983,275 | A * | 11/1999 | Ecclesine | 709/231 |
| 6,144,675 | A * | 11/2000 | Wakabayashi et al. | 370/516 |
| 6,173,023 | B1 * | 1/2001 | Tanonaka et al. | 375/357 |
| 6,219,335 | B1 * | 4/2001 | Luk | H04L 12/437 370/222 |
| 6,414,941 | B1 * | 7/2002 | Murakami | 370/245 |
| 6,606,362 | B1 * | 8/2003 | Dalzell et al. | 375/356 |
| 6,714,563 | B1 * | 3/2004 | Kushi | 370/503 |
| 6,865,188 | B1 * | 3/2005 | Stirling et al. | 370/460 |
| 6,952,396 | B1 * | 10/2005 | Cottreau | H04L 12/2852 370/222 |
| 7,400,234 | B2 * | 7/2008 | Becker et al. | 340/438 |
| 7,483,398 | B1 * | 1/2009 | Huai et al. | 370/258 |
| 7,917,109 | B2 * | 3/2011 | Becker et al. | 455/151.4 |
| 2002/0003848 | A1 * | 1/2002 | Wendorff | 375/356 |
| 2002/0023137 | A1 * | 2/2002 | Bahren et al. | 709/206 |
| 2002/0073228 | A1 * | 6/2002 | Cognet et al. | 709/236 |
| 2002/0131370 | A1 * | 9/2002 | Chuah et al. | 370/252 |
| 2003/0035444 | A1 * | 2/2003 | Zwack | 370/503 |
| 2003/0063684 | A1 * | 4/2003 | Czekaj et al. | 375/295 |
| 2003/0147345 | A1 * | 8/2003 | Takagi | H04J 3/085 370/222 |
| 2003/0152177 | A1 * | 8/2003 | Cahill-O'Brien et al. | 375/354 |
| 2003/0225916 | A1 * | 12/2003 | Cheon | H04L 69/324 709/251 |
| 2005/0033862 | A1 * | 2/2005 | Blum et al. | 709/248 |
| 2005/0262253 | A1 * | 11/2005 | Li et al. | 709/231 |
| 2005/0289224 | A1 * | 12/2005 | Deslippe et al. | 709/208 |
| 2006/0026471 | A1 * | 2/2006 | Kubota et al. | 714/724 |
| 2006/0187932 | A1 * | 8/2006 | Barthel et al. | 370/394 |
| 2008/0183897 | A1 * | 7/2008 | Carlson et al. | 709/248 |
| 2009/0022052 | A1 * | 1/2009 | Yoshimaru | H04L 12/437 370/223 |
| 2009/0034538 | A1 * | 2/2009 | Sato | H04L 12/437 370/400 |
| 2009/0100189 | A1 * | 4/2009 | Bahren | H04L 12/422 709/231 |
| 2009/0180465 | A1 * | 7/2009 | Closset et al. | 370/350 |
| 2009/0316588 | A1 * | 12/2009 | Nakamura | H04L 12/437 370/249 |
| 2010/0067408 | A1 * | 3/2010 | Kono | H04L 12/66 370/276 |

OTHER PUBLICATIONS

Unknown author; MOST Network: Windows Automotive 4.2; Microsoft corporation; 3 Pages.*

Unknown author; Media Oriented Systems Transport (MOST) network; Vector Informatik GmbH; 5 Pages.*

M.S. Obaidat and M.A. Al-Rousan; Protocol for Token Ring Local Computer Networks and its Performance; Oct. 14, 1991; Electronics Letters vol. 27 No. 25; 2393-2394.*

Unknown author; MOST Registry Settings; Microsoft corporation; 2 Pages.*

Media Oriented Systems Transport (MOST) Specification, Chapter 3.1.3.1, MOST Cooperation, 1999, Rev 2.5, Oct. 2006, 242 pages.

* cited by examiner

DATA NETWORK WITH A TIME SYNCHRONIZATION SYSTEM

BACKGROUND OF THE INVENTION

1. Priority Claim

This application claims the benefit of priority from European Patent 07019478.2 dated Oct. 4, 2007, which is incorporated by reference.

2. Technical Field

The disclosure relates to matching frame counter values of a timing master with a slave device in a synchronous network.

3. Related Art

The need to transfer data has made high-speed technology an important part of many networks. Some systems optimize communication paths. The networks may rely on fiber optics to efficiently communicate in a non-mobile or mobile environment. The networks may interface peripheral devices like microphones and speakers, navigation systems, and support audio or video streaming.

Some mobile networks support synchronous and asynchronous communication. The networks may use polymer optical fiber to support one or more nodes, control data channels, and plug-and-play functionality. The networks may include a physical layer, a transport layer, a link layer, a network management interface, and application programming interfaces.

Nodes within a synchronous network, such as a telephone network, may fulfil certain synchronization requirements to ensure communication. These requirements may be unfulfilled when maintenance work is performed or when errors occur. As problems occur the time need to re-synchronize a network may cause frame loss. Frame loss may also occur when a slave device is added to a network. In view of the high demands networks must support, these events may contest network robustness.

SUMMARY

A system matches frame counter values between a timing master and one or more slave devices in a synchronous network. To detect synchronization losses, a timing master counts transmitted frames of a continuous data stream. When a synchronization loss occurs, the timing master transmits a message to the slave devices that includes a synchronization frame counter value. The message synchronizes the frame counter value of the timing master to the frame counter value of the slave devices.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A network provides a system-wide time base by processing transmitted data frames in a synchronous network. An application layer may adapt to the time base when slave device applications are enabled to access a number of transmitted data frames. Since a common time base may define the delays between audio and video playback on the application level, the process may synchronize playback of audio and video data through a plurality of local or distributed devices (e.g., terminals) in communication with the network.

In some systems, transmitted frames of a continuous data stream are counted through a timing master. When a synchronization loss is detected, a timing master may transmit a message to some or all slave devices in the communication with the network. The communication may include a synchronization frame counter value that synchronizes the frame counter value of the timing master and the frame counter value of the slave devices. The slave devices may be synchronized to a common frame counter value. Between the transmissions of synchronizing messages (by the timing master), the slave devices may count the received frames and may provide their frame counter value to applications executed by the slave devices. By this process, a synchronisation loss or a frame loss may be quickly detected which may minimize the recognizable loss of a synchronization. The process may facilitate a quick network resynchronization when a loss occurs.

A system may support many protocols including mobile based protocols that serve vehicle networks. The systems may support one or more of a Media Oriented Systems Transport (MOST) bus (e.g., MOST 25, frames comprising 64 bytes: 1 byte administrative or preamble, 60 bytes streaming data, 2 bytes control messages, 1 byte administrative or parity), a Controller Area Network (CAN) protocol, an SAE J1850 protocol, a Variable Pulse Width Modulated (VPWM) protocol, a Pulse Width Modulated (PWM) protocol, an Itellibus protocol, a Distributed Systems Interface (DSI) protocol, a byte-flight protocol, a Bosch-Siemens-Temic (BST) protocol, a Mobile Multimedia Link (MML) protocol, a Flex Ray protocol, a Domestic Digital Data Bus (D2B) protocol, an IDB-1394 protocol, a SMARTwireX protocol, an International Organization for Standardizations (ISO) protocol and/or other mobile protocols.

The matching of frame counter values of a timing master and a slave device in a closed loop or ring network may occur through a frame counter. The frame counter may track or count the number of frames transmitted by the timing master. When synchronization is lost, the timing master may transmit a message that includes synchronization frame counter value. The frame counter value of one or more slave devices may be programmed or set to the synchronization frame counter value (e.g., a common frame counter value) transmitted from the timing master. In some applications, the detected synchronization loss may correspond to a frame counter value n. The synchronization frame counter value may correspond to the frame counter value n+1. In other applications, the synchronization frame counter value may correspond to the number of frames that have been successfully transmitted by the timing master before the synchronization loss was detected.

The loss of synchronization may be detected by the timing master. Such a loss may be discovered when a loss of a transmitted frame in a continuous data stream occurs or when a preamble of a transmitted frame is not received by the timing master at an expected or a programmed point in time (e.g., a time of day). Some losses may be detected when a network change is detected. This may occur when a change in the number of nodes, devices, or slave devices are detected during a network operation The message transmitted by the timing master may include a synchronization frame counter value and a timestamp of a reference clock. The transmission may occur upon an event (e.g., an action or occurrence to which the system may respond) or may occur periodically. In some applications, the synchronization frame counter value and time stamp may be transmitted within a field of control data that is linked to a transmitted frame. In operation, one or more slave devices (or nodes) may synchronize with the timing master's clock reference. The synchronization may occur through a process that determines a real-time clock reference based on a last received timestamp of the timing master's clock reference and the number of frames received since the reception of the timestamp. The process may be executed by one or more slave devices, and in some processes, may access the frame count value of the slave device(s). In other processes, a network controller of the slave device may provide the frame count.

Changes in the states of one or more slave devices or events related to the slave devices may be monitored and stored with a respective frame counter value in a local or distributed local (e.g., in-vehicle) or remote (e.g., out-of-vehicle) memory. When executed by the slave device(s), applications may access the respective stored information. The information may be related to a change in the states, events, and/or frame counter values.

In some systems, the timing master may include a processor that communicates with or simulates a frame counter. The frame counter may count the frames of the continuous data stream transmitted by a transmitter. The processor may be programmed to detect a loss of synchronization or loss of a transmitted frame in a continuous or interrupted data stream. In some systems, the transmitter may transmit one or more messages comprising a synchronization frame counter value when a loss or failure is detected.

The system may support many network topologies including one or more mobile or non-mobile local area networks in which devices (or nodes) are connected in a closed loop or ring. A processor may comprise or interface a node or slave device. In this topology, the processor may maintain a frame counter that may count the frames of the continuous data stream received from a timing master. The processor may establish a frame counter value for one or more slave devices. In some systems, the processor may communicate with the timing master.

An alternative system includes a computer-readable storage medium that may store software or instructions that, when executed by a timing master (or processor/controller emulating a timing master), may cause the timing master to initiate matching frame counter values for the timing master and for one or more slave devices. The matching may occur by counting frames of a continuous data generated by a transmitter of the timing master. A loss of synchronization or loss of a transmitted frame in the continuous data stream may be detected. When a loss of synchronization or loss of a transmitted frame is detected, a message may be transmitted comprising a synchronization frame counter value. When the computer-readable storage medium is executed by a processor or controller, in some systems one or more slave devices may adapt or modify its frame count. The change may occur by counting frames of the continuous data stream received from the timing master. The frame counter value at one or more slave devices may be programmed to a synchronization frame counter value received from the timing master.

In the systems, a timing master in a synchronous network may transmit data frames periodically to all slave devices in communication through the network. The timing master may determine the bit rate and frame structure and detect synchronization losses, frame loss, and/or detect or initiate the resynchronization of a synchronous network. In some systems, a preamble indicates the beginning of a new data frame. Preambles may synchronize slave devices or nodes that may lock the slave devices to the timing master's transmitted bit stream. A preamble of a MOST protocol frame, for example, may be a code violation. The violation may mark the beginning of a next frame. A preamble may also be an escape sequence, or a feature of similar function. Once a network is connected and synchronized, the timing master may or will know when the preambles should arrive due to the fixed frame structure within the continuous data stream. This may be established by the timing master. In some synchronous systems, a slave device detects a preamble and synchronizes to the frame the preamble corresponds to. Thus, a slave device synchronizes to the bit rate that is predetermined by the timing master.

A frame counter value of the timing master may comprise a counter value that is incremented by the timing master after transmitting a frame. The frame counter value of one of the slave devices may comprise a value that is incremented by one or more slave devices when detecting and receiving a complete frame. A timestamp may be used to store the point in time an event in the network has occurred. Storing a point in time may occur through the timing master when detecting a failure, synchronization loss, a frame loss, or other events on the network. The lapsed time may correspond to the timing master's reference clock.

A synchronization frame counter value may comprise a counter value that corresponds to the frame counter value of the timing master. The synchronization frame counter may be utilized by the timing master to transmit its frame counter value to the slave devices of the network. When a synchronization frame counter value is received, the slave devices attached to the network may set their frame counter value to the synchronization frame counter value. A sync-message may comprise a message transmitted to the slave devices that include either the synchronization frame counter value or a combination of the synchronization frame counter value and a time indicator or timestamp. The timestamp may indicate the time of day, day of week, month and/or year when an event occurred on the network.

The timing master may transmit a sync-message during a network set-up or during an initialization phase of a network. In some systems the sync-message is transmitted continuously in predetermined intervals to synchronize the network. This may occur if the network was previously synchronized and operating in a normal mode without a failure.

The frame counter may be represented by a predetermined number of bits. Its length may depend on a desired range of values. In some systems a larger range of values may be represented. The frame counter may be represented by at least 32 bit. A large length may ensure that no overflow or wrap-around conditions occur between the transmission and reception of two sync-messages. The time interval at which the counter may be incremented without an overflow or wrap-around condition may comprise a relation between a bit rate and a frame length. In some networks, like a MOST50, a frame counter represented by about 32 bits may not be susceptible to an overflow or wrap-around condition, even if a slave device has not received a sync-message within approximately twenty four hours.

In some systems, a smaller range of values may be represented by either the counter of the timing master and the slave devices. This may occur if the range of values is equal or about equal. In this set-up, an overflow or wrap-around condition may occur at the timing master and all slave devices at substantially the same time so that synchronization is not lost.

During the time interval between the receptions of two sync-messages, the slave devices may provide a substantially exact time reference that may be used by applications running at the slave devices. The networks provide a system-wide time base by processing the number of transmitted data frames in the underlying synchronous network. When the network is being synchronized, the timing master may count the transmitted frames while each of the slave devices counts the received frames. The values are stored as a frame counter value. When no errors occur, all frame counter values are equal.

The timing master may detect whether a frame loss has occurred due to a network interruption or a loss of synchronization (e.g., due a change in nodes or devices that may occur with the addition of slave devices or a delay in frame transmissions). System resynchronization may occur by transmitting a frame counter value form the timing master to all slave devices. The transmission may ensure that all frame counter values match.

The applications running on the slave devices may enable access to the frame counter values. Slave device access may allow the application layer to adapt to the system-wide time base. Through a resynchronization, a synchronous playback may occur. In an audio or video data application, a plurality of terminals may be synchronized to a common time base. The time base may be used to define delays between audio and video playback on the application level. In some applications, a substantially exact time reference may be used to playback audio or video synced content (e.g., to move in synchronization like a lip-synch) through two or more displays, audio drivers, and/or loudspeakers. In another application the synchronization may render a plurality of real time or delayed camera signals or other content.

In automotive applications, the local area network may interface many automotive devices. The devices or slaves may be connected in a closed loop in which messages are passed from one node to the next or from one device to another. The networks are not limited to a proprietary or open source bus protocol such as a MOST network bus. The bus may interface or communicate with multimedia devices, one or more navigation systems, speakers, displays, and other system. In some applications the network may comprise a ring network. In some networks transmission delay may be shorter than the time needed to transmit a frame.

Figure 1:
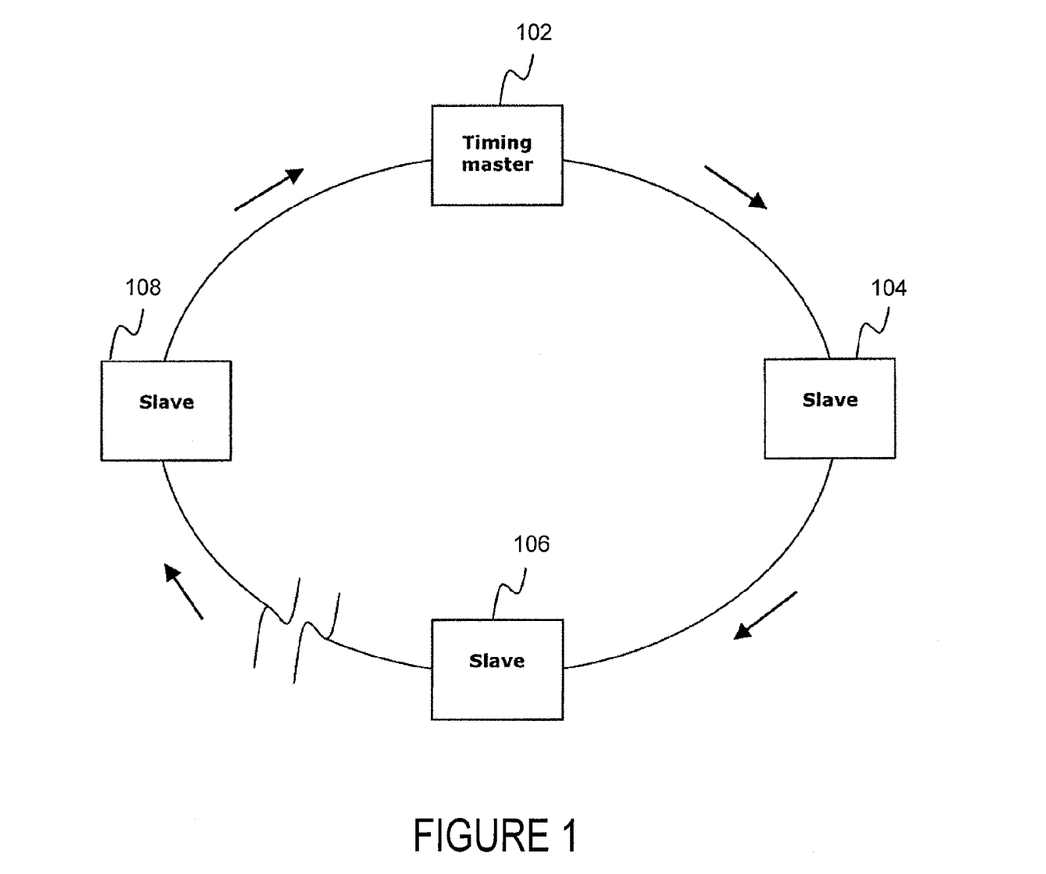
FIG. 1 is a closed loop synchronous network.

FIG. 1 shows a synchronous network in which devices (nodes) are connected in a closed loop. With the bit rate determined, a timing master 102 continuously passes data frames around the network. The frames may be received by all slave devices (nodes) linked to or in communication with the network. The data may pass in one direction as shown by the arrows in FIG. 1. The network may include two, three, four, or more nodes or slave devices, although three devices are shown.

The network may support many mediums, buses, and protocols. The network may be an optical synchronous network, like an SDH network or a MOST network, for example. The ring shape may interconnect multimedia devices in structures that transport person or things (e.g., vehicles). Within the synchronous base data signal, multiple streaming data channels and a control channel may be transported. A control channel may set up the streaming data channels the transmitter and receiver are to use. With the connection established, data may flow continuously without further addressing or processing of packet label information. The streaming data channels bandwidth may be continuously available and reserved for the dedicated stream. This may ensure that there are no interruptions, collisions, or slow-downs in the transport of the data stream.

Figure 2:
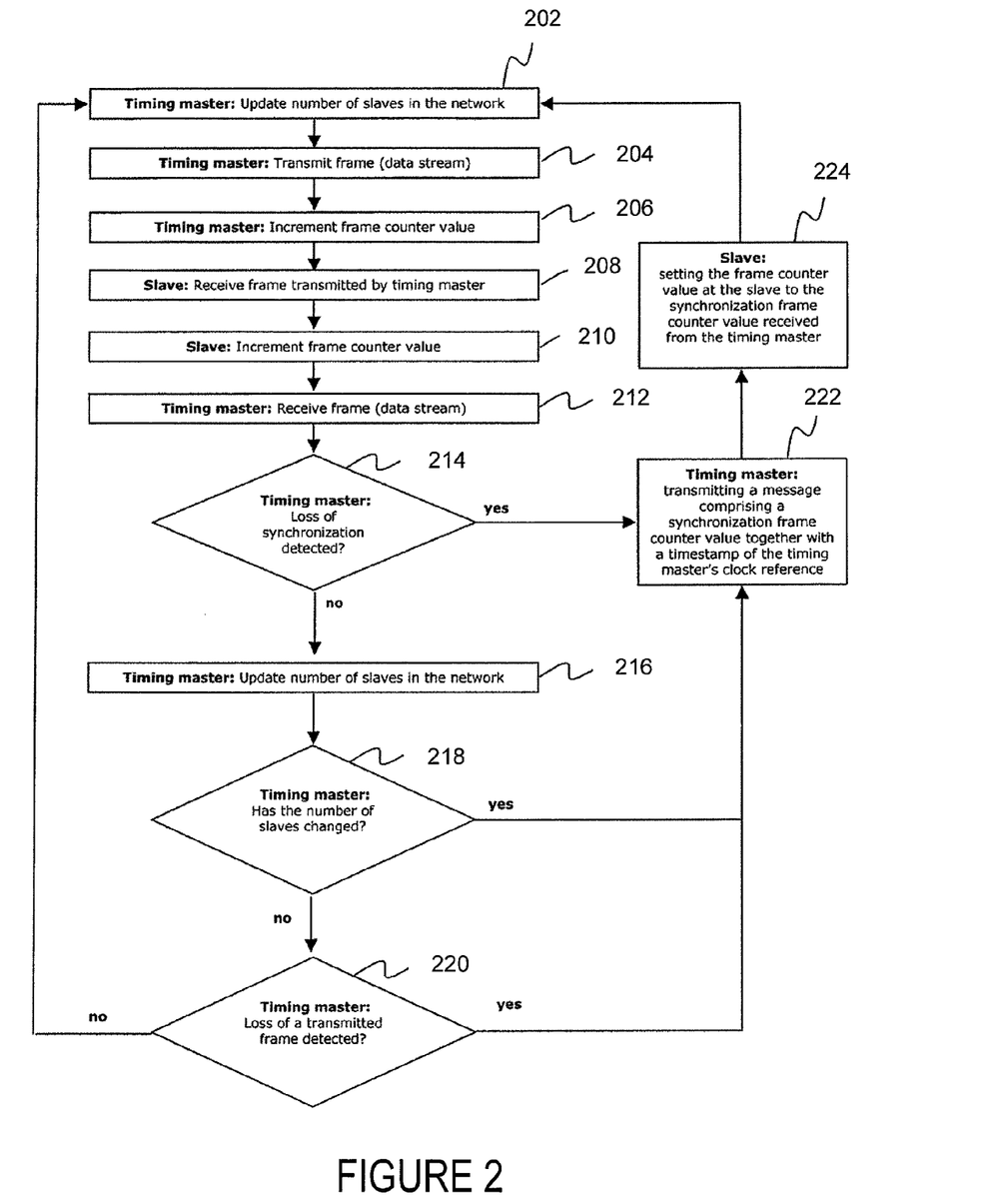
FIG. 2 is a method of matching frame counter values of a timing master and a slave device.

FIG. 2 is a method of matching frame counter values of a timing master and a slave device. Initially, a timing master updates the slave devices at 202. This may occur by periodically or continuously transmitting a frame that counts the slave devices in the ring network. Upon receipt of the frame, the slave device may increment a counter value. If each slave device connected to the network increments the counter value, the timing master, which receives the returned frame, may determine the number of in network slave devices. At 202 the timing master registers the slave devices in-network.

At 204, the timing master may transmit or pass a data frame of the continuous data stream in the closed loop or ring network. Once transmitted, the timing master increments a frame counter value at 206 that represents the number of transmitted frames by the timing master. At 208, a first slave device may receive the data frame transmitted from the timing master. In FIG. 1, the first slave device 104 increments its own (e.g., local) frame counter value at 210 when the data frame is processed. Depending on the number of slave devices connected to the network, 208 and 210 may be repeated for each slave device or node.

At 214, the timing master receives its previously transmitted data frame that was passed around the closed loop. Receipt of the data frame may confirm network continuity and further confirm that each node received and regenerated (or passed on) the message. At 214, the timing master may verify if a loss of synchronization occurred. The detection process may compare the sent data frame with the received data frame. The process may compare preambles. Any differences in the preambles may indicate a lost synchronization. Some processes do not evaluate the payload sections of the frames, others do.

If, a forwarding delay by a slave device occurs, the preamble of a returned frame may be received by the timing master at an unexpected time. The difference may indicate that the network is not in a state of synchronicity. Once detected, the timing master may initiate a resynchronization at 222. If synchronization is confirmed at 214, the timing master may update the nodes (or devices) connected to the network at 216. The updates may be based on the increments of the counter values made by each slave device. A counter value of the frames may represent the number of slave devices connected to or in communication with the closed loop or ring network.

At 218, the timing master compares the received counter value of the frame with the stored number of slave devices. The stored value may represent the count written to a local or distributed memory at 202. If a loss of synchronization has not occurred at 218, the process may check for loss frames at 220. If a lost frame is detected at 220, the timing master may resynchronize the network at 222. Otherwise, the process of FIG. 2 may repeat at 202.

When the number of slave devices in communication or connected to the network changes, the timing master resynchronizes the network at 222. A resynchronization may occur through a transmission a message that may include a synchronization frame counter value. The synchronization frame counter value may comprise a frame counter value of the timing master. In some processes, the synchronization frame counter represents the number of the actual transmitted frames. The message may include a time identifier such as a timestamp. The timestamp may be associated with the timing master's reference clock to document the point in time a synchronization loss or frame loss occurred.

When a message is transmitted by the timing master, each slave device may accept the message and examine it by comparing its own frame counter value (or local value) with the synchronization frame counter value included in the received message at 224. Through this comparison, the process may ensure that each of the frame counter values including that of the timing master are equal. As the network is resynchronized, the process 202-220 will repeat for each data frame.

Through the process of FIG. 2, a synchronization loss or a loss of a transmitted frame are reliably and quickly detected. When a synchronization loss is detected, the timing master may quickly resynchronize the slave devices and nodes to the timing master. In operation the process avoids the recognizable effects of a synchronization loss. This process may be used in many applications, including multimedia applications that may require terminals or controllers to maintain a synchronous state.

When no synchronization loss occurs, each slave device may increment its own frame counter value (or local value) after each data frame is received. Additionally, the slave devices may execute local applications in accordance with their frame counter value to ensure that an exact time base is available for such applications.

In some situations, a slave device may wrongly detect a frame, a preamble of a frame, or may not detect a frame or preamble at all. Such situations may occur, when slave devices do not synchronize to a predetermined clock rate associated with the predetermined frame structure in the data stream. As a consequence, the network may lose synchronization, which may be known as a "Unlock-Status". Due to the failed synchronization of the slave device, frames may not be forwarded correctly. This situation may be detected by the timing master. When detected, the timing master may resynchronize the network.

Figure 3:
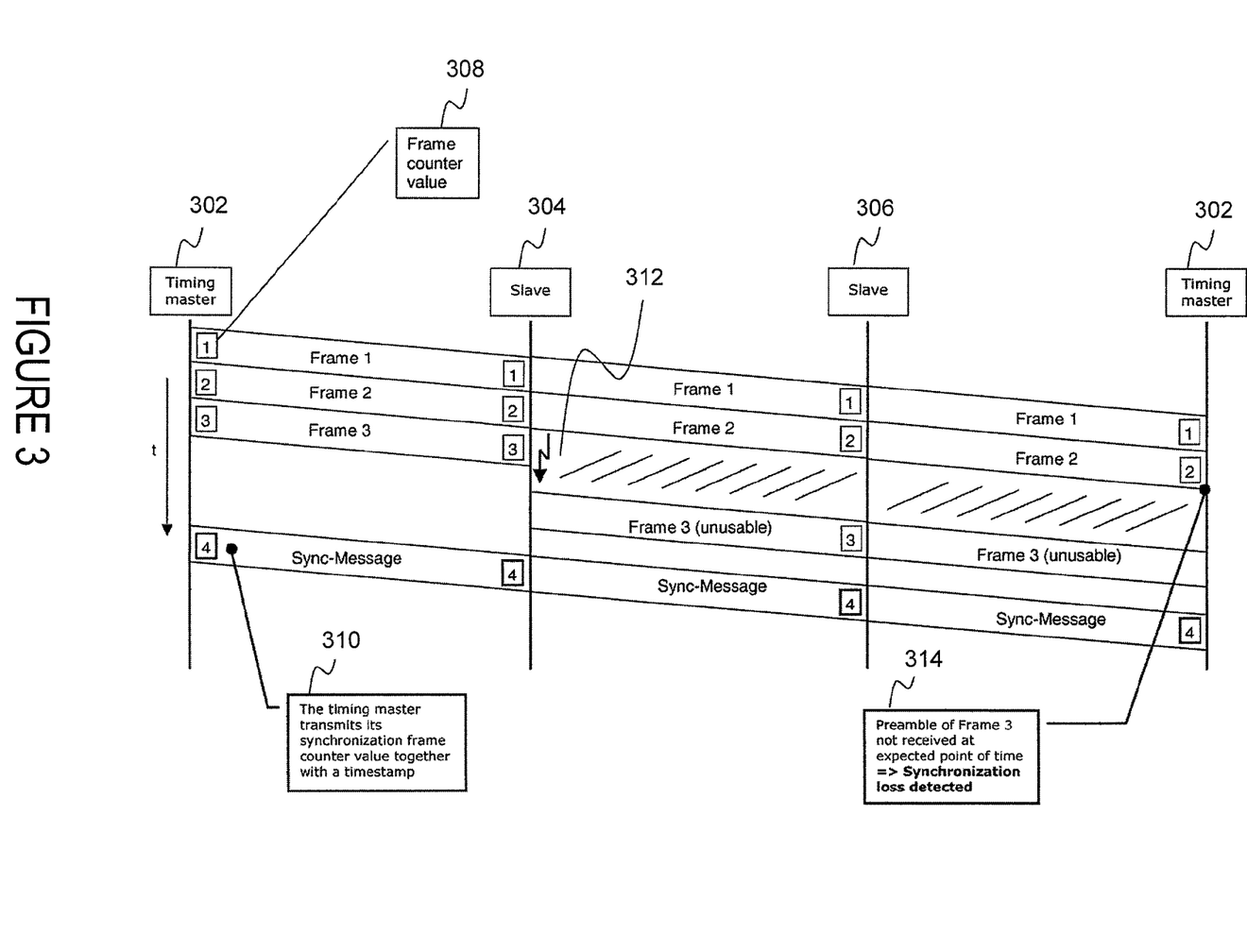
FIG. 3 shows the detection of a lost synchronization.

FIG. 3 shows the detection of a lost synchronization. The network includes a timing master 302 and two slave devices (slave device 304 and slave device 306). A left portion of the timing diagram of the timing master 302 represents the state of the timing master 302 transmitting frames. The right-most portion of the timing diagram of the timing master 302 represents the timing master receiving frames. FIG. 3 also shows the frame counter values counted by the timing master 302 (308), which are incremented after each transmitted frame.

As identified by 312, slave device 304 causes a delay in forwarding frame 3 to slave device 306. The delayed forwarding of frame 3 does not correspond to the frame structure or clock cycle predetermined by the timing master 302. As a consequence, the timing master 302 may not receive the preamble of the previous sent frame at an expected point in time. In this situation, the timing master 302 identifies a synchronisation loss (314). The detection of a synchronization loss at 314 may be similar to the loss detected at 214 of FIG. 2. Once detected, the transmitted frame 3 may not be further processed by some systems.

To resynchronize the network the timing master 302 may transmit a sync-message to each of the slave devices. The sync-message may include a synchronization frame counter value, and in alternative processes, it may include a timestamp 310. The frame at which the loss of synchronization was detected by the timing master 302 may correspond to the frame counter value n. The synchronization frame counter value may correspond to the frame counter value n+1. In the example of FIG. 3, the frame counter value at which the loss of synchronization has been detected is "3" and the synchronization frame counter value which is included in the sync-message is "4". However, the synchronization frame counter value may also correspond to the number of frames that have been successfully transmitted by the timing master 302 before a loss of synchronization was detected. In such case, the synchronization frame counter value would be "2", because in the example of FIG. 3 only two frames have been transmitted successfully. After the slave devices have received the message together with the synchronization frame counter value, they may be resynchronized by matching their frame counter value with the received synchronization frame counter value of the sync-message.

Figure 4:
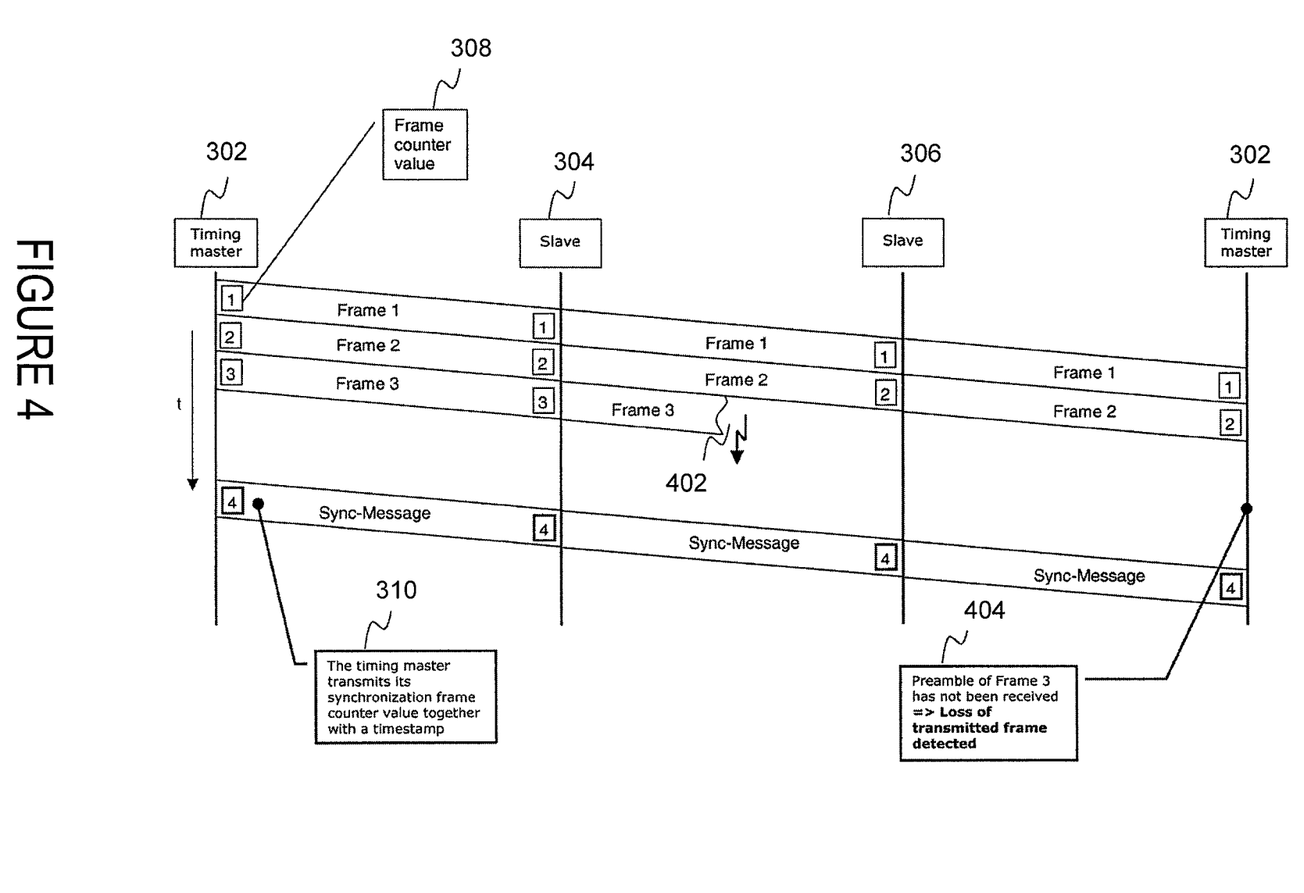
FIG. 4 shows the detection of a lost transmitted frame.

FIG. 4 shows the detection of a lost transmitted frame. The timing diagram includes a timing master 302 and, for illustration purposes, two slave devices (slave device 304 and slave device 306). A left-most portion of the timing diagram section represents the timing master 302 transmitting frames. The right-most portion of the timing diagram section represents the timing master 302 receiving frames. FIG. 4 also shows the frame counter values counted by the timing master 302 (308), which are incremented after each transmitted frame is processed. The frame counter values of both slave devices 304 and 306 are also shown.

At 402, after slave device 402 has forwarded frame 3, a corruption of the frame 3 occurs and slave device 306 is unable to detect frame 3. As a consequence of this failure, the timing master 302 may not receive the preamble of the previous transmitted frame. A loss of the transmitted frame 3 occurred at 404. The detection of the loss at 404 may be similar to the process shown at 220 of FIG. 2.

When a loss of synchronization is detected, the timing master 302 may transmit a message. In FIG. 4 the message may comprise a sync-message that is passed around the network to all slave devices. The sync-message may include a synchronization frame counter value and in some processes include a timestamp (310). In this example, the number of the frame, which has been lost and detected by the timing master 302, may correspond to the frame counter value n. The synchronization frame counter value may correspond to the frame counter value n+1. In FIG. 4, the loss of frame 3 has been detected. Thus, the frame counter value at the timing master is "3" and the synchronization frame counter value which is included in the sync-message is "4". However, the synchronization frame counter value may also correspond to the number of frames that have been successfully transmitted by the timing master 302 before it detected a frame loss. In such a case, the synchronization frame counter value would be "2", as in the example of FIG. 4 only two frames have been transmitted successfully. After the slave devices have received the sync-message that may include the synchronization frame counter value, the device resynchronize by matching their frame counter values with the received synchronization frame counter value of the sync-message.

Figure 5:
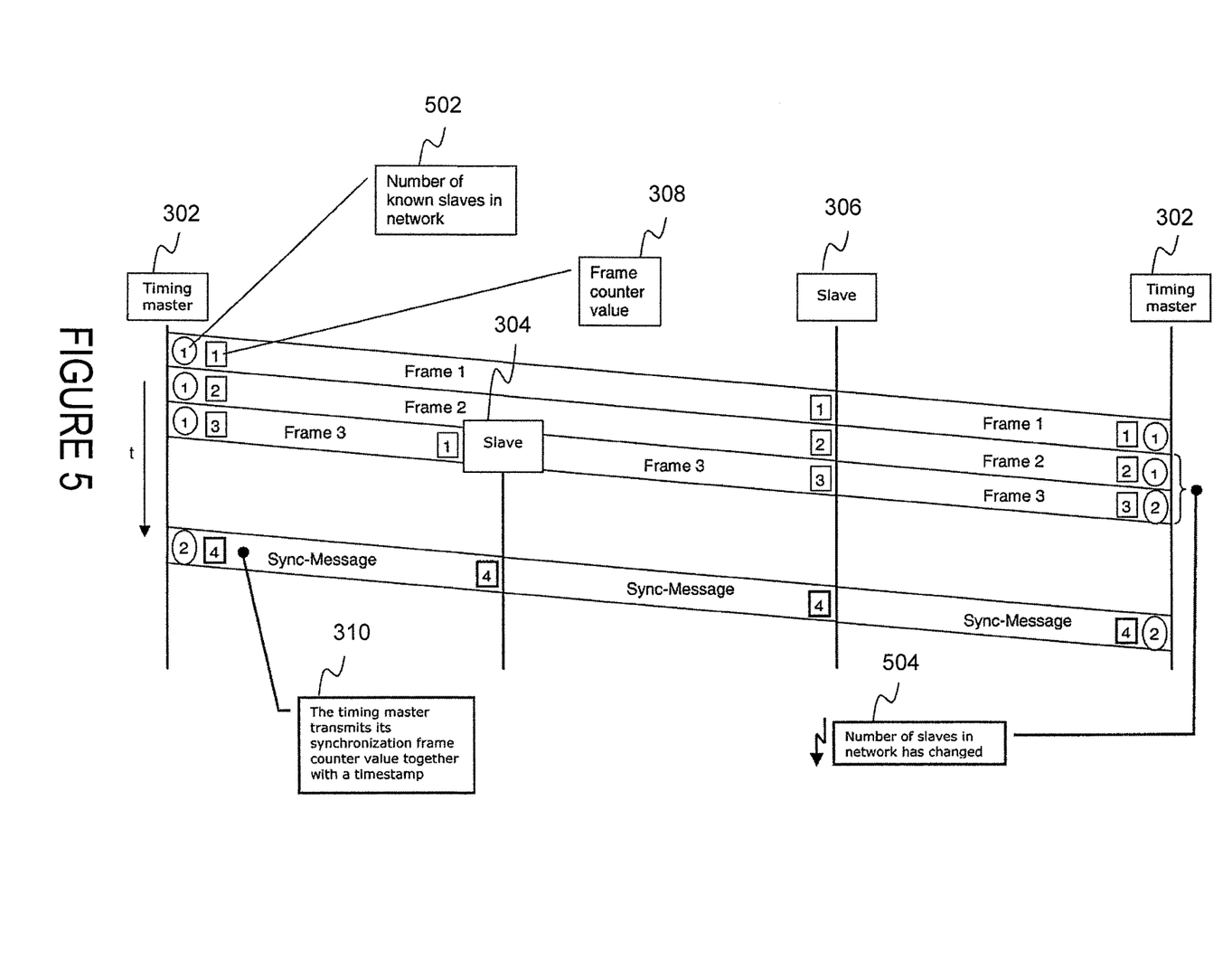
FIG. 5 shows the detection of a network change.

FIG. 5 shows the detection of a network change. The network includes a timing master 302 and slave device 3. A left-most portion of the timing diagram section represents the timing master 302 transmitting frames. The right-most portion of the timing diagram section represents the timing master 302 receiving frames. FIG. 5 also shows the frame counter values counted by the timing master 302 (502), being incremented after each transmitted frame. Also, the frame counter values at slave device 3 and the number of known slave devices by the timing master 302 are shown for each transmitted frame.

During transport of frames 1 and 2, only slave device 3 is known by the timing master 302. This is represented by the number of known slave devices in the network being "1" in this example (502). In FIG. 5, it is further shown that slave device 2 is connected or in communication with the network after the timing master 302 has transmitted frame 3. Upon receipt of the first frame, slave device 2 sets its frame counter value to "1". As soon as the timing master 302 compares the values of the number of known slave devices in the network after the reception of frame 3, it may recognize that the number of slave devices has changed (504). Upon recognizing the change, the timing master 302 may determine that the frame counter values of the slave devices and the timing master itself are not the same. Hence, the timing master 302 may initiate a resynchronization because one of the slave devices (slave device 2), may require an initial frame counter value. A resynchronization may occur through the transmission of a sync-message by the timing master 302. It may include the synchronization frame counter value, and in some processes, further include a timestamp. The timestamp may be the point in time the transmission of the message occurred or may identify the point in time that the slave device 2 began communicating through the network.

When re-synchronizing the network, the timing master 302 may transmit one or more messages. In FIG. 5 the message may comprise a sync-message to each (or all) of the slave devices connected to the network. The message or messages may include a synchronization frame counter value and in some processes include a timestamp (310). In the example of FIG. 5, the sync-message includes the synchronization frame counter value "4" and optional information such as a value of the number of slave devices detected or known by the timing master 302. To re-synchronize the network, the slave devices match their frame counter values with the received synchronization frame counter value of the sync-message.

The systems may detect many failure conditions. The timing master 302 may detect node additions and failures (the number of slave devices changes 504), frame delays, frame losses, and corrupted frames or preambles, some of which are shown in FIGS. 3 and 4. In some situations, the timing master 302 may transmit two sync-messages, one message for the resynchronization due to loss of a frame as shown in FIG. 4 and one message for resynchronization due to loss of synchronization as shown in FIGS. 3 and 5.

Additionally to matching frame counter values of a timing master 302 and the slave devices, the timing master 302 may also retransmit the delayed or corrupted frame after the network has been resynchronized. In some circumstances that concern the synchronization frame counter value, the timing master 302 may alternatively reset the synchronization frame counter value to a programmed value such as value "0."

Some systems may automatically track performance through an audit trail or log. By including a timestamp in a sync-message, it is possible to document all failures and unlock-states of the network. When sync-messages are stored in a local or distributed memory, the data may be accessed and analyzed to track life-cycles and failure modes of the devices, nodes, and the network(s) that interconnect them.

In some systems, all events occurring at the network may interface the slave devices. The events may be marked with the frame counter value of a respective slave device. This alternative process allows the system to store details (data) of all the events that occur on or through the network. The details or data may be processed by the applications running locally at the slave devices. Changes in the network states or the reception of messaged may be stored with a time-stamp for later processing, for example.

Figure 6:
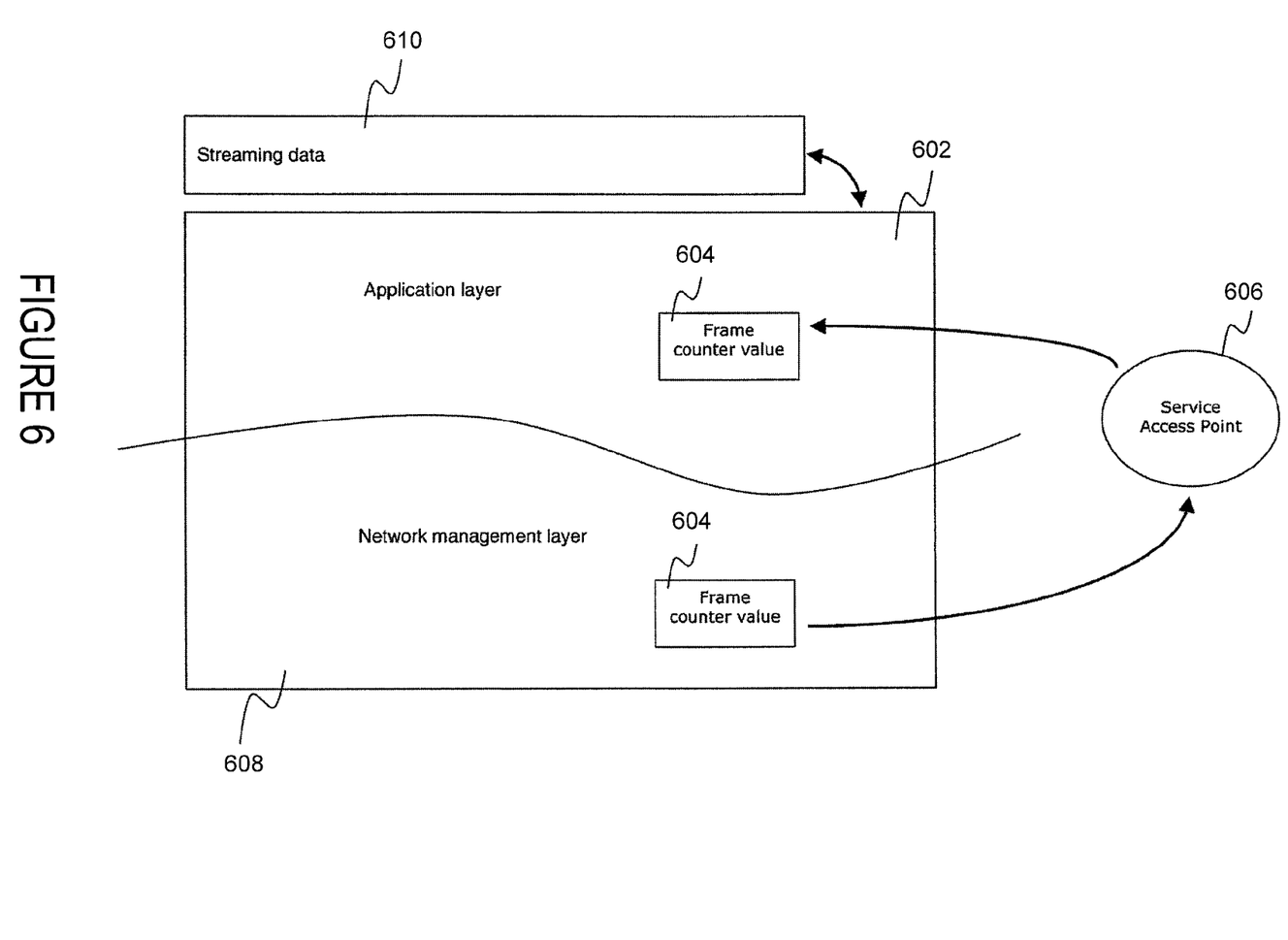
FIG. 6 shows an interface between a network management layer and an application layer.

FIG. 6 shows an interface between a network management layer 608 and an application layer 602. The network management layer may represent all lower layers that are responsible for the reception of frame counter values and for forwarding the frame counter values to the application layer. The application layer may represent all upper layers that are responsible for playback of, for instance, streaming data (610). The layers shown in FIG. 6 represent each slave device.

FIG. 6 shows how a network management layer may communicate with the frame counter value (604) to the application layer. The communication may control the streaming data at the application layer. The streaming data may comprise media or multi-media (e.g. a movie, audio, navigation data, etc.). An exemplary first slave device may represent a loudspeaker and a second slave device may represent a display. In some systems, the slave devices are remote from each other; in other systems they are located locally. In such a case, the streaming data is may be divided into an audio streaming data and a video streaming data. Each data sequence may have an independent playoff time.

When a loss of synchronization occurs, a timing master may resynchronize the network by providing its frame counter value to all slave devices. In FIG. 6 the network management layer forwards a received frame counter value to a service access point (606). The service access point may represent the interface between the lower and the upper layers. When received, the service access point may forward the frame counter value to the application layer. The network wide transmission of the frame counter value may denote a system-wide time base. When the application layer has received and processed the frame counter value, the slave devices match their frame counter values with the received values. Through this process, the application layer is able to use the system-wide time base to synchronize media, including the media that may comprise a movie (e.g., audio, video, graphics, etc.).

Other alternate systems and methods may include combinations of some or all of the structure and functions described above or shown in one or more or each of the figures. These systems or methods are formed from any combination of structure and function described or illustrated within the figures. Some alternative systems or devices compliant with one or more of the mobile or non-mobile bus protocols may communicate with one or more controllers, software drivers, and displays including touch sensitive displays. In-vehicle wireless connectivity between the nodes and one or more wireless networks may provide alternative high speed connections that allow users or devices to initiate or complete a function at any time within a stationary or moving vehicle. The wireless connections may provide access to, or transmit, static or dynamic content. The interoperability of some devices and networks to in-vehicle networks and external wireless protocols allows some devices to provide primary or back-up functionality to in-vehicle equipment, including OEM and/or aftermarket equipment.

The methods and descriptions above may be encoded in a signal bearing medium, a computer readable medium or a computer readable storage medium such as a memory that may comprise unitary or separate logic, programmed within a device such as one or more integrated circuits, or processed by a controller or a computer. If the methods or descriptions are performed by software, the software or logic may reside in a memory resident to or interfaced to one or more processors or controllers, a communication interface, a wireless system, a powertrain controller, body control module, an entertainment and/or comfort controller of a vehicle or non-volatile or volatile memory remote from or resident to the a speech recognition device or processor. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable storage medium or signal-bearing medium, for use by, or in connection with an instruction executable system or apparatus resident to a vehicle or a hands-free or wireless communication system. Alternatively, the software may be embodied in media players (including portable media players) and/or recorders. Such a system may include a computer-based system, a processor-containing system that includes an input and output interface that may communicate with an automotive, vehicle, or wireless communication bus through any hardwired or wireless automotive communication protocol, combinations, or other hardwired or wireless communication protocols to a local or remote destination, server, or cluster.

A computer-readable medium, machine-readable storage medium, propagated-signal medium, and/or signal-bearing medium may comprise any medium that contains, stores, communicates, propagates, or transports software for use by or in connection with an instruction executable system, apparatus, or device. The machine-readable storage medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for matching frame counter values of a timing master and at least one slave device in a synchronous network having a ring topology, comprising:
    counting frames of a continuous data stream transmitted by the timing master through a master frame counter of the timing master;
    counting one or more of the frames of the continuous data stream received from the timing master by the at least one slave device through a local slave frame counter of the at least one slave device in the ring topology by incrementing the local slave frame counter responsive to receiving each of the one or more frames of the continuous data stream from the timing master;
    receiving, by the timing master, one or more frames of the continuous data stream transmitted by the timing master from the at least one slave device;
    comparing, by the timing master, the one or more frames of the continuous data stream received from the at least one slave device with one or more frames of the continuous data stream transmitted by the timing master;
    determining, by the timing master, a number of slave devices in the network, the number of slave devices determined based on increments of a counting frame counter value by each slave device in response to receiving a frame transmitted by the timing master for counting the number of slave devices;
    detecting, by the timing master, a network condition, the network condition including one or more of a loss of synchronization, a loss of a transmitted frame in the continuous data stream, and a change in configuration of the network, and differentiating between the loss of synchronization, the loss of the transmitted frame, and the change in configuration of the network based on a comparison of the one or more frames of the continuous data stream received from the at least one slave device with the one or more frames of the continuous data stream transmitted by the timing master, and based on a master frame counter value of the master frame counter, a local slave frame counter value of the local slave frame counter, and the determined number of slave devices based on the counting frame counter value;
    transmitting, by the timing master to the at least one slave device, a message comprising a synchronization frame counter value in response to detecting the loss of synchronization, the loss of the transmitted frame in the continuous data stream, or the change in configuration of the network; and
    setting the local slave frame counter value of the local slave frame counter of the at least one slave device to the synchronization frame counter value received from the timing master by the at least one slave device;
    wherein differentiating between the loss of synchronization, the loss of the transmitted frame, and the change in configuration of the network comprises determining, with the timing master, that the loss of synchronization in the continuous data stream has occurred by recognizing that a preamble of a transmitted frame is not received by the timing master at an expected point in time.

2. The method of claim 1, where the synchronization frame counter value is processed to synchronize the master frame counter value of the timing master and the local slave frame counter value of the at least one slave device.

3. The method of claim 2, where the frame at which the loss of synchronization has been detected by the timing master, corresponds to a frame counter value n, and the synchronization frame counter value corresponds to a frame counter value n+1.

4. The method of claim 1, where the synchronization frame counter value corresponds to a number of frames that have been successfully transmitted by the timing master before the loss of synchronization is detected.

5. The method of claim 1, where the detection comprises determining when a preamble of a transmitted frame is not received by the timing master at an expected time of day.

6. The method of claim 1, where detecting that the preamble for the transmitted frame was not received comprises comparing a preamble of a received frame with a value of the master frame counter.

7. The method of claim 1, where the timing master transmits the message, comprising the synchronization frame counter value, periodically in time.

8. The method of claim 1, where the timing master transmits the message comprising the synchronization frame counter value with a timestamp of a timing master's reference clock.

9. The method of claim 1, where the synchronization frame counter value or the synchronization frame counter value and a timestamp is comprised in a respective field of a control data section of a transmitted frame, and wherein the frames of the continuous data stream comprise media or multi-media for playback via one or more of the slave devices in the ring topology.

10. The method of claim 8, where frames are transmitted periodically in time by the timing master.

11. The method of claim 10, where the at least one slave device synchronizes with the timing master's reference clock by determining a real-time clock reference based on a last received timestamp of the timing master's reference clock and a number of frames that have been received since reception of the timestamp of the timing master's reference clock.

12. The method of claim 11, further comprising enabling an application programmable code retained in a storage media to be executed by the at least one slave device to access the determined real-time clock reference.

13. The method of claim 1, further comprising enabling an application program retained in a storage media to be executed by the at least one slave device to access the local slave frame counter value of the at least one slave device.

14. The method of claim 1, where differentiating between the loss of synchronization, the loss of the transmitted frame, and the change in configuration of the network comprises determining, with the timing master, that the change in configuration of the network has occurred by comparing, upon receipt of the frame by the timing master, the counting frame counter value of a counting frame counter of the frame to a stored number of slave devices in the network.

15. The method of claim 1, where changes in states of the at least one slave device or any events that occur at the at least one slave device are monitored and stored in a local memory with a respective frame counter value, and where an application executed by the at least one slave device is enabled to access respective stored information on changes in the states of the at least one slave device or any events that occur at the at least one slave device together with the frame counter values.

16. The method of claim 1, where the synchronous network has the ring topology and comprises a Media Oriented Systems Transport (MOST) network implemented in an automotive environment; and further comprising, in response to the timing master receiving the transmitted frame of the continuous data stream, detecting a network change based on a change in the number of slave devices and a determination, by the timing master, that the master frame counter value is not equal to the local slave frame counter value of the at least one slave device.

17. A timing master in a synchronous network having a ring topology with a plurality of slave devices in the synchronous network, the timing master comprising:
   a processor that maintains a master frame counter adapted to continuously count frames of a continuous data stream transmitted by a transmitter of the timing master to the plurality of slave devices in the synchronous network having the ring topology, where the processor is further adapted to detect a network condition, the network condition including one or more of a loss of a synchronization, a loss of a transmitted frame in the continuous data stream, and a change in configuration of the network, a differentiating between the network conditions being based on a comparison of one or more of the frames of the continuous data stream received by the timing master from the plurality of slave devices in the synchronous network having the ring topology with one or more of the frames of the continuous data stream transmitted by the transmitter, and based on a master frame counter value of the master frame counter, a local slave frame counter value of a local slave frame counter provided at and maintained by each of the plurality of slave devices for counting frames of the continuous data stream received by the plurality of slave devices from the timing master based on each of the plurality of slave devices incrementing a respective local slave frame counter maintained at that slave device responsive to receiving the frames of the continuous data stream from the timing master, and a change in a number of slave devices,
   where the processor is further adapted to compare a counting frame counter value in a received frame as incremented by a plurality of slave nodes with a value for a number of slave devices in the network stored in a memory of the processor to determine the change in the number of slave devices and the change in configuration of the network, and
   where the transmitter is further adapted to transmit a message comprising a synchronization frame counter value when the processor detects the loss of synchronization or the loss of the transmitted frame in the continuous data stream or the change in configuration of the network,
   the synchronization frame counter value corresponding to a counted number of frames that have been successfully transmitted by the timing mastery;
   wherein differentiating between the loss of synchronization, the loss of the transmitted frame, and the change in configuration of the network comprises determining, with the timing master, that the loss of synchronization in the continuous data stream has occurred by recognizing that a preamble of a transmitted frame is not received by the timing master at an expected point in time.

18. A slave device in a synchronous network with a timing master, the synchronous network having a ring topology, the slave device comprising:
   a processor that maintains a local slave frame counter adapted to count frames of a continuous data stream received over the synchronous network having the ring topology from the timing master by incrementing the local slave frame counter responsive to receiving each of the frames of the continuous data stream from the timing master;
   where the processor is further adapted to increment a counting frame counter value in response to a frame transmitted by the timing master to determine a change in a number of slave devices; and
   where the processor is further adapted to process a message received from the timing master that includes a synchronization frame counter value indicative of a network condition, the network condition including one or more of a loss of a synchronization, a loss of a transmitted frame in the continuous data stream, and a change in configuration of the network, a differentiation between the loss of the synchronization, the loss of the transmitted frame, and the change in configuration of the network being based on a comparison of one or more frames of the continuous data stream received by the timing master from the slave device with one or more frames of the continuous data stream transmitted by the timing master, and further based on a master frame counter value of a master frame counter provided at the timing master for counting one or more frames of the continuous data stream transmitted to the slave device from the timing master, a local slave frame counter value of the local slave frame counter, and the change in the number of slave devices based on a counting frame counter in a received frame as incremented by the number of slave devices, and set the local slave frame counter value of the slave device to the synchronization frame counter value;

wherein differentiating between the loss of synchronization, the loss of the transmitted frame, and the change in configuration of the network comprises determining, with the timing master, that the loss of synchronization in the continuous data stream has occurred by recognizing that a preamble of a transmitted frame is not received by the timing master at an expected point in time.

19. A non-transitory computer-readable tangible storage medium that stores instructions that, when executed by a timing master, cause the timing master to initiate matching frame counter values of the timing master and at least one slave device, by counting frames of a continuous data stream transmitted by a transmitter of the timing master through a master frame counter, detecting a change in a number of slave devices, the detection based on comparison of a counting frame counter value in a received frame as incremented by a plurality of slave devices in a network with a value for the number of slave devices stored in a timing master memory, detecting a loss of synchronization or a loss of a transmitted frame in the continuous data stream, the detection including differentiating between the loss of synchronization and the loss of the transmitted frame based on a comparison of one or more of the frames of the continuous data stream received by the timing master with one or more of the frames of the continuous data stream transmitted by the transmitter, and further based on a master frame counter value of the master frame counter, a local slave frame counter value of a local slave frame counter provided at each of the plurality of slave devices for counting one or more frames of the continuous data stream received by the plurality of slave devices from the timing master by incrementing with a respective one of the plurality of slave devices the local slave frame counter responsive to receiving each of the one or more frames of the continuous data stream from the timing master, and the change in the number of slave devices based on the counting frame counter value, transmitting a message comprising a synchronization frame counter value when the loss of synchronization or loss of the transmitted frame in the continuous data stream is detected, and where the message includes a timing master frame count value;

wherein differentiating between the loss of synchronization, the loss of the transmitted frame, and the change in configuration of the network comprises determining, with the timing master, that the loss of synchronization in the continuous data stream has occurred by recognizing that a preamble of a transmitted frame is not received by the timing master at an expected point in time.

20. A non-transitory computer-readable tangible storage medium that stores instructions that, when executed by at least one slave device, cause the at least one slave device to adapt a local slave frame counter value of the at least one slave device, by counting frames of a continuous data stream received from a timing master through a local slave frame counter by incrementing the local slave frame counter responsive to receiving the frames of the continuous data stream from the timing master, processing a message received from the timing master that includes a synchronization frame counter value indicative of a loss of a synchronization or a loss of a transmitted frame in the continuous data stream, a differentiation between the loss of the synchronization and the loss of the transmitted frame being based on a comparison of one or more frames of the continuous data stream received by the timing master with one or more frames of the continuous data stream transmitted by a transmitter, and further based on a master frame counter value of a master frame counter provided at the timing master for counting one or more frames of the continuous data stream transmitted to the at least one slave device from the timing master, the local slave frame counter value of the local slave frame counter, and a change in a number of slave devices, setting the local slave frame counter value of the at least one slave device to the synchronization frame counter value, and incrementing a counting frame counter value in a frame in response to receiving the frame transmitted by the timing master to determine the change in the number of slave devices in a network, where the synchronization frame counter value is indicative of the loss of the synchronization or the loss of the transmitted frame in the continuous data stream;

wherein differentiating between the loss of synchronization, the loss of the transmitted frame, and the change in configuration of the network comprises determining, with the timing master, that the loss of synchronization in the continuous data stream has occurred by recognizing that a preamble of a transmitted frame is not received by the timing master at an expected point in time.

* * * * *